Aug. 1, 1967  A. MARZOCCHI  3,334,166
METHOD OF MAKING A TIRE MOLDING COMPOUND
Filed May 7, 1965  2 Sheets-Sheet 1

INVENTOR
Alfred Marzocchi
by Staelin + Overman
Attys

INVENTOR
Alfred Marzocchi
by Staelin & Overman
Att'ys

United States Patent Office 3,334,166
Patented Aug. 1, 1967

3,334,166
METHOD OF MAKING A TIRE MOLDING COMPOUND
Alfred Marzocchi, Cumberland, R.I., assignor to Owens-Corning Fiberglas Corporation, a corporation of Delaware
Filed May 7, 1965, Ser. No. 453,938
5 Claims. (Cl. 264—136)

This invention relates to the manufacture of glass fiber-elastomeric products and more particularly to an improved method for the manufacture of molded products of elastomeric materials reinforced with glass fibers, as in the manufacture of rubber tires, rubber belting, rubber hose, and the like.

To the present, fibrous reinforcement of elastomeric materials has progressed through the use of cotton, rayon, nylon, and polyester fibers somewhat in the order indicated. More recently, tremendous interest has developed in the utilization of glass fibers as a reinforcement for elastomeric materials in the fabrication of elastomeric products. This interest has developed by reason of the excellent physical and mechanical properties characteristic of glass fibers by comparison with other fibers, as evidenced by the following physical and mechanical properties of glass fiber filaments.

TABLE I.—GLASS FIBER SINGLE FILAMENT PROPERTIES

| | |
|---|---|
| Tensile strength | p.s.i.__ 500,000 |
| Tenacity | g.p.d.__ 15.3 |
| Ultimate elongation | percent__ 4.8 |
| Elastic recovery | do____ 100 |
| Toughness | p.s.i.__ 11,900 |
| Modulus | p.s.i.__ 10,500 |
| Coefficient of thermal expansion | $2.8 \times 10^{-6}$ |
| Water adsorbency | percent__ 0.3 |
| Moisture regain | do____ 0.0 |

The high tensile strengths, in the order of 500,000 p.s.i., toughness and elastic recovery, coupled with the filaments' infinite flexure life and stability indicates that glass fibers should be superior to other fibers as a rubber reinforcement after proper treatment for fuller utilization of the desirable properties of glass fibers can be effected in the glass fiber-elastomeric system.

In the utilization of glass fibers, as with others of the fibers employed in the reinforcement of elastomeric materials, glass fibers have been employed in the form of cords embodying a plurality of glass fibers which are first brought together into glass fiber bundles, such as strands or yarns, and in which the strands or yarns are wound, intertwisted and plied into cords. Commercial utilization of glass fibers in dynamic applications such as in tires, belting and the like has been limited by interfilament destructive action and poor translation of the excellent single filament properties of the multi-filament structures, such as strands, yarns and cords.

It has been found that the properties of the glass fibers can more effectively be utilized in the elastomeric system by a combination of glass fiber treatments to provide an anchoring agent on the surfaces of the glass fibers which enhances the bonding relationship between the glass fiber surfaces and the elastomeric materials; glass fiber forming sizes applied to the individual glass fibers to coat the fibers with a protective agent and lubricant before gathering the fibers together in strand or yarn formation; and impregnation of the glass fiber bundle, yarn, strand or cord with a composition containing an elastomeric material, preferably compatible with the resinous system forming the continuous phase in the glass fiber-elastomeric product to achieve glass fiber separation and avoid destruction of the glass fibers by mutual abrasion and to cushion the fibers one from the other in the glass fiber bundle while permitting readjustment of the fibers for alignment of a plurality of the fibers in the direction of force for more effectively translating the single filament properties into the multi-filament structure in the build-up of strength as a reinforcement, and more effectively to intertie the multi-filament structure with the elastomeric system.

Glass fibers formed into multi-filament structures in the manner described compare very favorably with the multifilament structures formed or other organic reinforcing fibers of the type heretofore employed, as illustrated by the following table comparing cords of impregnated bundles of glass fibers with similar cords formed of rayon, nylon and polyester fibers presently used in elastomeric systems:

TABLE II.—REINFORCEMENT CORD PROPERTIES—GLASS FIBERS VERSUS ORGANIC CORDS

| | Glass Fibers | Rayon | Nylon | Polyester |
|---|---|---|---|---|
| Strength, p.s.i. | 407,000 | 94,000 | 122,000 | 104,000 |
| Toughness, p.s.i. | 9,900 | 5,800 | 10,200 | 9,900 |
| Impact Resistance, Ft. Lbs. $\times 10^{-4}$/denier | 3.95 | 1.87 | 4.08 | 3.41 |
| Modulus, p.s.i. $\times 10^{-6}$ | 8.45 | 0.96 | 0.63 | 0.57 |
| Elongation, percent | 4.8 | 9.8 | 19.3 | 18.5 |

From the foregoing table, it will be noted that cords of glass fibers provide reinforcement which is at least three times greater in strength than the better of the cords formed of the synthetic organic fibers. The toughness and impact resistance of the glass fiber cords is at least equivalent to, if not better than, the cords formed of the organic synthetic fibers.

Because of the high dimensional stability of glass fibers, rubber products reinforced with cords of glass fibers enjoy a high degree of dimensional stability with fixed elongation properties. Because of the relatively inert characteristics of glass fibers by comparison with others of the synthetic organic fibers heretofore employed in rubber systems, temperature or humidity changes have little, if any, effect on the physical properties or dimensions of the input cords, the unvulcanized portions and the elastomeric end product. This permits for more precise manufacturing control and more predictable end product dimensions which deviate very little during use.

One of the first commercial applications made of impregnated cords of glass fibers has been in the construction of rubber drive belts. Under actual tests under operating conditions, it has been found that permanent stretch was four times greater with rayon cords than with reinforcing cords of glass fibers. Automotive drive belts have been run for over 80,000 miles without the need to reset a rubber belt reinforced with cords of glass fibers. In practice, it has been found that rubber belts reinforced with impregnated cords of glass fibers result in less costly belt production, belts capable of higher loading stresses, decreased bearing size requirements, belts which run smooth and provide for better power transmission with less upkeep, adjustment, repair or replacement.

Equivalent improvements have been experienced in the used of impregnated cords of glass fibers in the reinforcement of tires where longer wear life is achieved with greater tire strength and greater mileage with a very comfortable ride. Similar improvements have been secured in the construction of rubber hose with cords of glass fibers embedded within the continuous phase of elastomeric material as a reinforcement.

In all of these applications, use has been made of the glass fibers in the form of cords wherein the fibers have been subjected to the treatments described of sizing in forming, gathering the fibers together into multi-filament structures, plying, twisting and winding the multi-filament structure, and including impregnation with a system containing an elastomeric material and preferably an anchoring agent.

In the manufacture of belts, as described in the copending application Ser. No. 247,244, filed Dec. 26, 1962 entitled, "Belts and Other Glass Fiber-Elastomeric Structures and Method of Manufacture," the endless cords of glass fibers are laid down in a specified arrangement with layers of elastomeric material and then cut and flipped before arranging into molds for vulcanization under heat and pressure to form the desired composite belt structure.

Similarly, in tire manufacture, the cords are either laid down with the cords in one layer at an opposite angle with the cords in adjacent layers in a bias wound tire, or with cords extending radially crosswise between the beads of the tires in a radially wound tire, with sheets of rubber in between to form the carcass portion which is molded with layers of rubber forming the tread portion to vulcanize the elastomeric material in tire formation.

Likewise in rubber hose reinforced with glass fibers, the glass fibers in the form of cords are arranged to extend lengthwise through the mold between layers of elastomeric material for molding under heat and pressure to cure the rubber or else the elastomeric material may be extruded in hose formation with the cords being fed to be embedded therein.

The impregnated cords of glass fibers are relatively costly by reason of the number of processing steps required to be performed in strand formation, sizing and impregnating the fibers and strands, winding, twisting and plying the strands, all of which require additional labor, equipment and space. The use of impregnated cords is also subject to objection from the standpoint of the requirement properly to lay down the cords in the arrangement desired in the finished product and to anchor the cords so that they will retain the desired position during the fabricating steps in the formation of the tire, belting and the like. Furthermore, the cords constitute a structure now formed of thousands of single filaments whereby difficulties in translation of single filament properties into the multi-filament structure are greatly increased.

Thus, it is an object of this invention to provide a method and means for the reinforcement of elastomeric materials with glass fibers in the manufacture of molded glass fiber-elastomeric products wherein better translation of single filament properties can be achieved in multi-filament structures; wherein utilization can be made of the glass fibers without the necessity previously to process the glass fibers into cords or into woven fabrics; wherein utilization can be made of glass fibers in multi-filament structures without the necessity to effect the number of pretreatments previously required for conditioning the glass fibers for combination with the elastomeric materials; wherein benefit can be derived from the utilization of glass fibers in the combination of elastomeric materials without the need accurately to locate the fibrous structure for combination with the elastomeric material; wherein the glass fiber component can be combined with the elastomeric material to form a compound that can be molded to the desired shape or product by conventional molding steps and means thereby to alleviate many of the processing steps heretofore required in the reinforcement of elastomeric materials with any fibrous system, including glass fibers or others of the organic fibers employed in the manufacture of reinforced rubber products; and wherein a fiber distribution and arrangement can be achieved in the molded product for optimum utilization of the single filament properties of the glass fiber component.

These and other objects and advantages of the invention will hereinafter be described and for purposes of illustration, but not of limitation, embodiments of the invention are shown in the accompanying drawings, in which.

Figure 1:
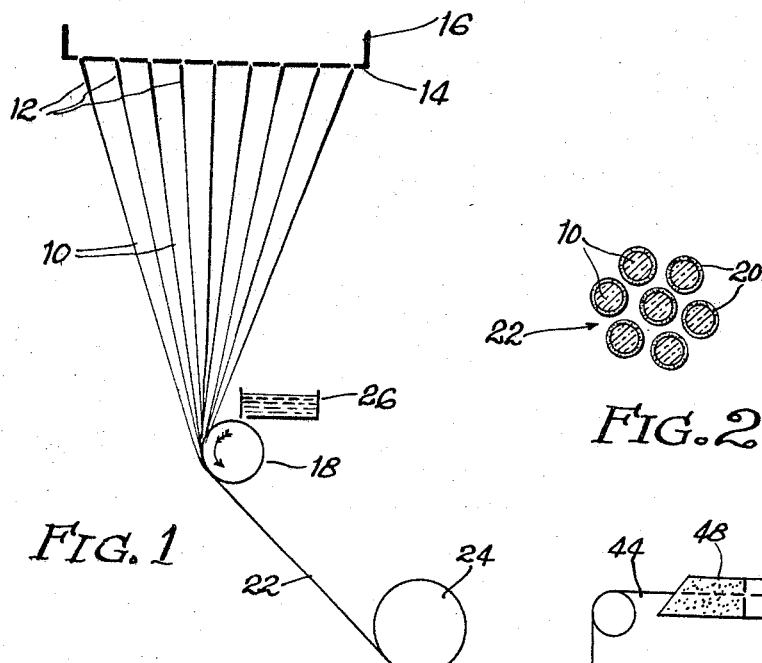
FIG. 1 is a schematic elevational view of the continuous forming and sizing of glass fibers in strand formation.
Figure 2:
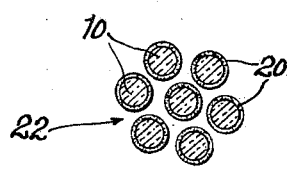
FIG. 2 is a fragmentary sectional view of a multi-filament structure of glass fibers in the form of a strand of sized glass fibers produced by the process of FIG. 1.
Figure 3:
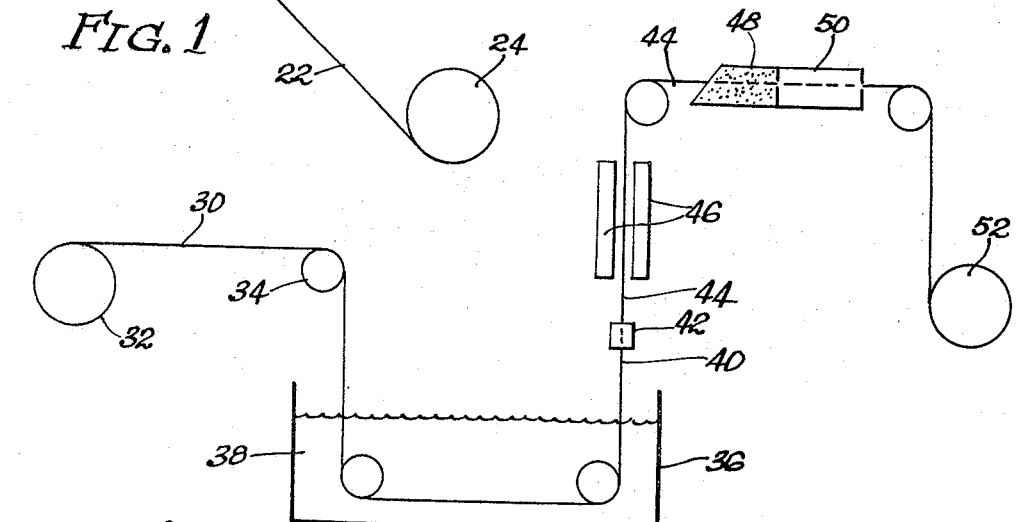
FIG. 3 is a schematic elevational view of the method and means for impregnation of the strand or bundle of glass fibers.
Figure 4:
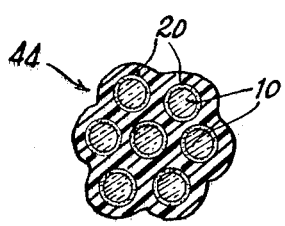
FIG. 4 is a fragmentary sectional view of the impregnated bundle of glass fibers produced in accordance with FIG. 3.
Figure 5:
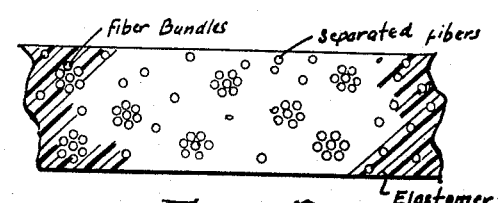
FIG. 5 is a fragmentary sectional elevational view through a section of the molding compound prepared in accordance with the practice of this invention.

It has been found, in accordance with the practice of this invention, that when a strong bonding relationship is established between the glass fiber surfaces and the elastomeric material, sufficient of the desirable properties of the glass fibers can be retained in the glass fiber-elastomeric product when the glass fiber component is simply admixed with the elastomeric material to form a compound that can be molded to the desired shape to produce an elastomeric product of improved strength, wearability, flexure, toughness, dimensional stability and inertness without the necessity to make use of glass fiber cords laid down in a desired pre-arrangement for combinations with elastomeric materials.

The described concept for the mere admixture of the glass fiber component with the elastomeric material to produce a moldable compound depends upon a number of factors.

A strong and permanent bonding relationship should exist between the glass fibers and the elastomeric material. This has been accomplished in the system described by use of glass fibers having a surface treatment embodying an anchoring agent which enhances the bonding relationship between the glass fiber surfaces and the elastomeric material. Such anchoring agent, as represented by an amino silane such as gamma-aminopropyltriethoxy silane, or by a silane having a carboxyl group in the organic group attached to the silicon atom, or by an amino or carboxyl group in the carboxylato group of a Werner complex compound, may be applied to the glass fiber surfaces or incorporated as a component of a size composition applied to the glass fibers as the glass fibers are gathered together, as in the formation of strands, yarns and the like, all of which is more fully described in the copending application Ser. No. 406,501, filed Oct. 26, 1964, entitled, "Glass Fibers Treated for Combination With Elastomeric Materials and Method."

In addition thereto, the desired strong bonding relationship can be achieved by the impregnation of the strand, yarn, or other multi-filament glass fiber structure with a composition formulated to contain an elastomeric material, preferably in an uncured or unvulcanized state, as described in the aforementioned copending application Ser. No. 406,501, and as will hereafter be illustrated by way of examples.

The bonded relationship between the treated glass fibers and the elastomeric material is achieved by working the glass fibers into the elastomeric material, as by conventional rubber processing steps, such as by milling, mixing in a Banbury and the like. The amount of working is important since enough work is required to bring about the desired bonding relationship between the glass fiber surfaces and the elastomeric material but the compound should not be worked so much as to reduce the lengths of the glass fibers necessary for imparting the desired strength and toughness characteristics. In general, it has been found that in milling to form the compound into sheets, it is desired to make at least three passes between the mill rolls to enhance the bond but that the strength properties fall off after more then ten passes, perhaps because of the breakdown of fiber lengths.

The glass fiber component admixed with the elastomeric material should have a length sufficient to impart a strengthening or roughening effect. In general, the average length of the glass fiber component admixed with the elastomeric material should be at least ¼ inch and best results, from the standpoint of strength, toughness and workability or moldability, is achieved when the glass fibers have a length averaging from ⅜ to 1½ inches. As will hereinafter be pointed out, when the glass fiber component incorporated into the elastomeric material is formed with bundles of greater lengths and separated filaments of shorter lengths, optimum results are secured. Such lengths as have heretofore been described can be achieved from continuous or discontinuous fibers by chopping or cutting the bundles of fibers to the desired lengths.

The amount of glass fibers admixed with the elastomeric material will depend somewhat upon the amount of strengthening or reinforcement desired. Optimum strengths and reinforcement will be achieved by the use of glass fibers in an amount greater than 20% by weight of the molding compound but it is seldom possible to make use of an amount of glass fibers greater than 50% by weight of the molding composition. When an amount greater than 50% by weight of glass fibers is employed, the compound tends to mat and has insufficient flow for the fabrication of a solid molded product. Amounts less than 20% by weight can be employed but the amount of strengthening and toughening will correspondingly decrease and an amount less than about 3% by weight of glass fibers will have little, if any, beneficial effect.

An important concept of the invention resides in the further discovery that the strengthening and toughening effect derived by the admixture of glass fibers with the elastomeric material to produce a moldable compound is incapable of full development when the fibers are embodied as individual filaments in the elastomeric system. At least the major proportion of the glass fiber component in the elastomeric system should be in the form of multi-filament structures, such as bundles, strands or yarns of a plurality of glass fibers. Best results are secured when the majority of the glass fiber component (better than 60%) are present in the form of fiber bundles while the remainder (up to about 30%) are in the form of separated fibers, such as filaments or fibers separated from the bundles to provide separated fibers or smaller bundles of fibers, as by the milling or Banbury mixing operations.

The desired combination can be achieved efficiently by the admixture of a small increment of the fibrous component in the form of bundles with the elastomeric material before working. After subjecting the material to a portion of the working requirements, as by taking a number of passes between the mill rolls, the remainder of the bundles of glass fibers are incorporated after which working is completed. Thus the fibrous component first added will have separated from the fibrous bundles for greater distribution throughout the elastomeric material by reason of its greater amount of working while the major portion of the fiber bundles which are added later and subjected to lesser working will remain in the form of a more multi-filament structure distributed throughout the elastomeric system.

The combination of more separated fibers and fiber bundles in the elastomeric system will enable the individual fibers in the bundle to become aligned and to make the rubber work in shear instead of tension while the separated fibrous components will also tend to tie in the fiber bundles one with the other to eliminate weakness in between or cracking such as the characteristic radial cracking which often occurs in tires. Thus the combination of some individual fibers and a majority of fiber bundles in the elastomeric system operates to improve the physical properties of the reinforced molded rubber product.

Having described the basic concepts of the admixture of glass fibers with the elastomeric material to produce a compound from which a reinforced product can be molded, with or without cord reinforcement, to produce molded rubber products of high strength at low cost, description will now be made of illustrative procedures.

As used herein, the term "elastomer" is intended to include natural rubbers and synthetic organic rubbers such as neoprene, isoprene, isobutylene and butyl polymers and copolymers with styrene, acrylate, acrylonitrile and the like.

The term "glass fibers" is intended to refer to fibers of the continuous or discontinuous types and strands, yarns, cords and fabrics formed thereof. The invention will hereinafter be described with respect to continuous glass fibers but it will be understood that the concepts are capable of being practiced with discontinuous glass fibers blown from molten strands of glass and gathered together and drafted into yarns from which cords and threads may be formed.

Referring now to FIG. 1 of the drawings, continuous glass fiber filaments 10 are formed by rapid attenuation of a multiplicity of molten strands 12 of glass issuing from a bushing 14 on the bottom side of a glass melting furnace 16. The glass fibers 10 are drawn over an applicator 18 for coating the individual glass fibers with a size 20 as the fibers are gathered together to form a strand 22 that is wound about a rapidly rotating drum 24.

The size composition can be applied from a pad or from a roller 22 wet with the size composition as supplied from a reservoir 26. The glass fiber size is formulated of a combination of materials to impart lubricity and bonding and it is also preferably formulated to contain an anchoring agent. The following are represented of size compositions which may be applied to the glass fibers in forming:

*Example 1*

| | Percent by weight |
|---|---|
| Gamma-aminopropyltriethoxy silane | 0.5–2.0 |
| Glycerine | 0.3–0.6 |
| Remainder water. | |

*Example 2*

| | Percent by weight |
|---|---|
| Partially dextrinized starch | 8.0 |
| Hydrogenated vegetable oil | 1.8 |
| Lauryl amine acetate (wetting agent) | 0.4 |
| Non-ionic emulsifying agent | 0.2 |
| Glycyato chromic chloride | 1.0 |

*Example 3*

| | Percent by weight |
|---|---|
| Saturated polyester resin | 3.2 |
| Pelargonate amide solubilized with acetic acid | 0.1 |
| Tetraethylene pentamine stearic acid | 0.1 |
| Polyvinyl alcohol | 0.1 |
| Polyvinyl pyrrolidone | 3.0 |
| Gamma-aminopropyltriethoxy silane | 0.3 |
| Acetic acid | 0.1 |
| Water | 93.1 |

The size composition is merely applied to the glass fiber filaments as they are gathered together and the strand of sized glass fibers is allowed to dry in ambient air.

In the foregoing examples, the gamma-aminopropyltriethoxy silane can be replaced as an anchoring agent with other amino silanes such as gammo-aminopropylvinyldiethoxy silane, n(gamma-triethoxysilylpropyl)propylamine, beta-aminoallyltriethoxy silane, aniline silane derivatives, etc.

While it is not essential to impregnate the strand or bundle of glass fibers before cutting or chopping to the lengths desired for admixture with the elastomeric material in forming the molding compound, it is preferred to impregnate the bundle of glass fibers for fuller separation of the fibers one from the other in the bundle and to incorporate an elastomeric system into the interior of the glass fiber bundle whereby the fibers can more effectively become anchored in the elastomeric system.

For this purpose, the strand or yarn 30 of glass fibers is unwound from the drum 32 or other spindle and advanced over roller 34 into a housing 36 containing a bath 38 of the elastomeric impregnant. From the bath, the impregnated yarn 40 is pulled upwardly through a wiping die 42 which operates to work the impregnating liquid into the innermost regions of the bundle or strand of glass fibers and to wipe off excess material.

Since the invention does not depend on the composition of the impregnant, other than the presence of an elastomeric component, it will be sufficient merely to give a few illustrations of representative liquid compositions containing an elastomeric material and which may be used to impregnate the bundle or strand of glass fibers:

*Example 4*

| | Parts by weight |
|---|---|
| Neoprene rubber | 100 |
| Powdered magnesium oxide | 4 |
| Powdered zinc oxide | 5 |
| Channel Black | 15 |
| Thiate B (trialkyl thiourea accelerator) | 1 |

*Example 5*

| | Parts by weight |
|---|---|
| Paracril C rubber | 100 |
| SRF carbon black | 25 |
| Powdered zinc oxide | 5 |
| Aminox (reaction product of diphenyl amine ester) | 0.5 |
| Stearic acid | 1 |
| Dicumyl peroxide | 40 |

*Example 6*

| | Parts by weight |
|---|---|
| Natural rubber latex—resorcinol formaldehyde resin dispersed in aqueous medium to a 38% solids (Lotol 5440—U.S. Rubber Company) | 60 |
| Vulcanizing agent | 1 |
| Water | 39 |

*Example 7*

| | Parts by weight |
|---|---|
| Resorcinol formaldehyde resin | 2 |
| Formalin (37% solution) | 1 |
| Concentrated ammonium hydroxide | 2.7 |
| Vinylpyridine terpolymer (42% latex) | 25 |
| Neoprene rubber latex (50% solids) | 41 |
| Butadiene latex (60% solids) | 5 |
| Sodium hydroxide | .05 |
| Gamma-aminopropyltriethoxy silane | 1 |
| Vulcanizing agent | 1 |
| Water | 1100 |

In the impregnation of the glass fiber bundle, it is desirable to achieve as full impregnation as is possible to maximize the anchorage of the glass fibers in the bundle with the elastomeric material. For still fuller integration it is desirable also to make use of an elastomeric component in the impregnating composition which is compatible with the elastomer forming the continuous phase or which is still capable of sufficient flow during working or molding of the compound to blend with the continuous phase of elastomer during the molding and working operations. For this purpose, it is desirable to heat the impregnated strand or bundle of glass fibers by an amount sufficient either to drive off the diluent or to effect removal of the diluent plus advancement of the elastomeric component of the impregnant to a stage short of complete cure or vulcanization. Thus the impregnated strand 44 may be advanced beyond the die 42 to between heating elements 46 whereby the impregnated strand is heated to an elevated temperature for a time sufficient to drive off the diluent and, if desired, advance the elastomer, as more fully described in the copending application Ser. No. 406,501.

To protect the fibers against seizure during subsequent processing to cut or chop the strands or bundles to shorter lengths, the impregnated bundles 44 can be coated with a lubricant in the form of powdered zinc stearate, graphite, carbon black, silica dust, fine powdered glass and the like materials which need not be washed or otherwise removed from the surfaces since such materials can beneficially function either as a filler in the molded rubber product or as an agent which enters into the cure or vulcanization. Such dry powdered material can be sprinkled onto the impregnated bundle of glass fibers as it passes from the heating zone, as by passing the impregnated bundle under a sieve through which the powder is dispensed, or by running the impregnated strand 40 through a mound 48 of the powdered material followed by engagement of the strand with a brush or wiper 50 for removing excess from the surfaces of the bundle before the treated bundle of glass fibers is rewound upon the drum 52.

Thereafter, the endless bundle of fibers is reduced to shorter lengths as by processing the bundle of glass fibers through cutters or in a chopper wherein the fibrous bundles are reduced to the average length desired while still retaining the fibers in the multi-filament or bundle form. Reduction to an average length of ⅜ to ¾ inch is preferred for most applications.

As previously pointed out, it is desirable to retain the glass fibers in multi-filament structures in the elastomeric system since the desired translation is not fully achieved by the combination with elastomeric materials wherein the glass fibers are present only as individual filaments. Best results are secured when the majority of the glass fibers are present in multi-filament structures in the elastomeric compound while a smaller proportion of fibers are in the form of bundles of lesser filaments or as individual filaments. This end can be achieved in the preparation of the compound of glass fibers admixed with the elastomeric product when a small increment (5–30%) of the chopped or cut bundles of glass fibers are added to the elastomeric material which is then given a number of passes, such as three to five passes, through the mill rolls. After a number of passes, the remainder of the chopped or cut bundles of glass fibers are added and the additional passes are made up to a total of seven to nine passes, or such additional passes as will not undesirably affect the reinforcing properties of the glass fibers.

It will be found that the fibrous system which has been subjected to the great amount of working, as represented by the number of passes, will have become separated more than the remainder of fibers which have been incorporated during an intermediate portion of the working step whereby the bundles of fibers subjected to less work remain substantially intact to provide a system containing a larger proportion of fiber bundles and a smaller proportion of fibers separated from the bundles but in which all are uniformly distributed throughout the elastomeric system.

While use can be made of compounds wherein all of the fibers are present as bundles in the elastomeric material, best use is made of a mixture of fiber bundles and separated fibers but wherein the separated fibers constitute a small fraction of less than 30% of the fibrous system. It has also been found that improved translation and strength is achieved by variation in the lengths of the fibers with best results being secured by the use of fiber bundles of lengths longer than that of the separated fibers, as represented by the use of bundles having an average length of ½ to 1½ inches and separated fibers having an average length of ¼ to ½ inch.

The elastomeric compound having the glass fiber system worked into the elastomer for substantial uniform distribution can be molded, cured or vulcanized by conventional means into a belt, tire, or the like elastomeric product.

The fiber arrangement in the molded product can be somewhat controlled by the processing to incorporate the fibers into the elastomeric material in the preparation of the molding compound.

With reference first to the fabrication of rubber drive belts wherein fiber orientation in the longitudinal direction is desirable for maximizing strength and dimensional stability, the fiber bundles can be introduced into the sheet of rubber for milling with the fiber bundles extending in one direction. The rubber sheets are then passed between rollers for milling in the lengthwise direction of the fibers whereby fiber orientation in the lengthwise direction is maintained in the sheeted compound.

Thereafter, a belt forming mandrel is wrapped with the sheeted rubber compound with the fibers running in the circumferential direction. The sheeted compound can be used to form the entire cross-section of the belt or the mandrel can be wrapped first with a pure rubber layer, which functions as a cushioning layer, followed by the compounded layers and ending again with a cushioning layer thereby to have pure rubber at the surfaces with the reinforcing glass fibers distributed substantially throughout the cross-section in between.

The rubber compound built up in layers about the mandrel is then sliced circumferentially to reduce the cylindrical section into strips which can be removed by collapsing the mold.

The strips are scived or cut to V shape and then flipped by wrapping the V cut strips with rubber impregnated fabric or the belt can be formed directly, with or without sciving or flipping, as by molding directly under heat and pressure. The vulcanization reaction is carried out under positive pressure at a temperature of about 350° F.

Figure 6:
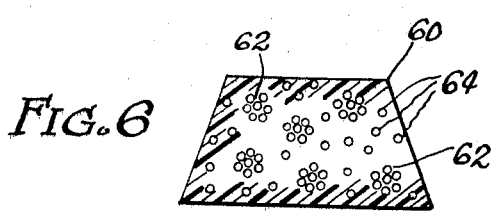
FIG. 6 is a sectional elevational view of a rubber molded belt embodying the features of this invention.
Figure 7:
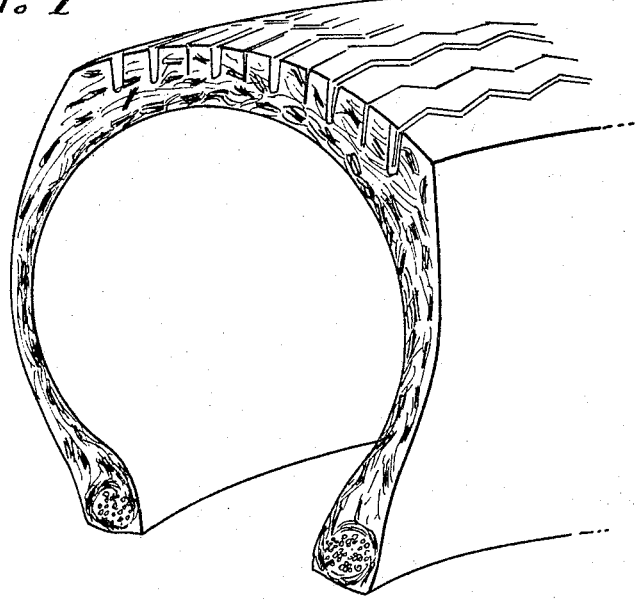
FIG. 7 is a sectional view of a molded rubber tire embodying the features of this invention.

In the cross-section of the final product (see FIG. 6) it will be seen that the glass fibers are uniformly distributed throughout the cross-section of the belt 60 with the great majority of the fibers still present in the form of bundles 62 with some individual fibers 64 or smaller bundles of fibers in between but with substantially all of the fibers extending in the longitudinal direction.

In the manufacture of rubber tires, the sheeted compound can be arranged in the mold in a manner depending somewhat upon the type of tire that it is desired to have produced. In the construction of a tire having the characteristics of a bias wound tire, the sheeted compound is laid down in the mold with alternate layers having the fibers extending in one direction at an acute angle with the longitudinal while the layers in between are laid down with the fibers at an opposite angle. Ordinarily, the fiber reinforced sheeted compound is used to form only the carcass portion of the tire but considerable advantage in strength and wearability will be achieved when the sheeted compound is included also to form the tread portions of the tire thereby to embody the glass fiber reinforcement throughout the tire.

All that remains is simply to mold the tire under heat and pressure for vulcanization thereby to eliminate the many time consuming and difficult procedural steps of wrapping and the like when cords of the types heretofore produced are used in fiber reinforcement.

In the molded tire, the fibers will maintain substantially the same arrangement as when laid down in the mold to offer good directional reinforcement as well as increased wear. The fibers will remain substantially uniformly distributed with the majority of the fibers present as fiber bundles intermixed with individual fibers thereby to tie in the entire assembly into a reinforced structure which is capable of assembly and molding in a relatively simple and easy manner by comparison with present constructions with cord reinforcements.

It is possible also to vary the fiber concentration throughout the cross-section of the tire by interspersing the sheeted compound with rubber sheets free of fiber reinforcement or with rubber sheets having a different amount of fibers, thereby more or less to tailor-make the fiber concentration and arrangement throughout the cross-section of the tire.

Figure 8:
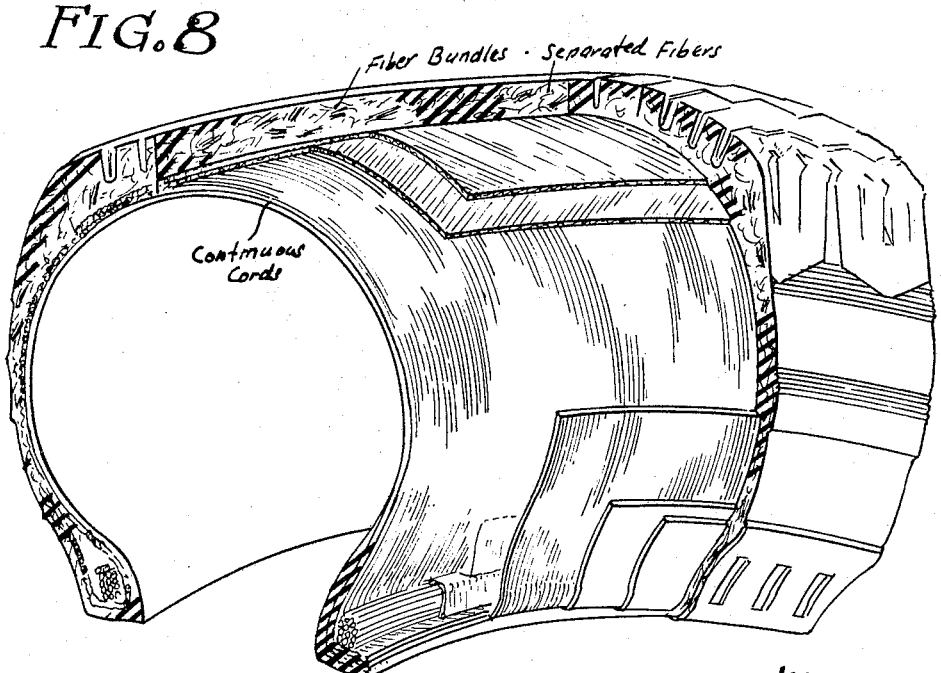
FIG. 8 is a sectional view of a rubber tire embodying the combination of this invention in a radially wound tire using glass fiber cord.

In the fabrication of radial tires, as illustrated in FIG. 8, the sheeted compound is laid up in the mold with the fibers running radially in the mold whereby the fibers will retain substantially the same arrangement in the final molded product. Enough of the fibers will be retained in the bead portion at the opposite sides of the tire to give the effect of cords running continuously from bead to bead thereby to give the effect of radial reinforcement.

Because of the exceptionally high strength and stability imparted by the glass fiber arrangements with glass fiber bundles intermixed with individual fibers, the strength characteristics capable of being derived by a molding compound of the type produced in accordance with the practice of this invention are as great as, if not greater than, in tires radially or bias wound with continuous cords. On the other hand, the fabrication steps are greatly simplified by reason of the fibrous components being incorporated directly into a compound from which the tires can be directly molded.

Marked improvements in the characteristics of strength, toughness and wearability of rubber tires can be achieved, as illustrated in FIG. 8, by the combination of conventional construction wherein fiber cords are laid down in the desired arrangement for bias wound or radially wound tires in the carcass portion with the elastomeric material making up the carcass portion and/or the tread portion being formed of the moldable compound of this invention which embodies the admixture of glass fiber bundles and individual glass fibers in uniform distribution with the elastomeric material.

Another outstanding feature of the present invention is a tire which may be prepared by conventional processes and which combines the desirable features of both radial and bias ply tries. Bias ply and radial tires coexist because of properties which are unique to each, but to date these properties have not been blended to incorporate the best features of each while eliminating the drawbacks which also attend each type. Essentially, the bias ply tire, which is the tire that has been adopted for use on American built cars, provides a more comfortable ride. It is capable of lower fabricating costs but it possesses a lower tread life and high resistance to rolling. The radial tire, which has found widespread use in the European market, enjoys increased tread life and traction and improved fuel economy and rolling resistance but it gives a harder or rougher ride and is weak in the areas between the adjacent radial cords and requires more expensive fabricating techniques.

As previously mentioned, a bias ply tire can be economically duplicated by use of the compounds of this invention through the employment of alternate superimposed plies containing unidirectional glass fiber arrangements with each ply having its glass fiber component oriented in a direction which forms an acute angle with the direction of the fibers in the ply upon which it is superimposed. In addition, the stability of a bias ply tire will be improved by a construction wherein the sheeted compound of this invention is introduced to form one layer or section in which the glass fiber component parallels the tread. In addition, the tread wear can be increased by formation of the tread from the materials of this invention to embody glass fibers in the tread section of the tire. Similarly, the radial tire may be improved by formation of the tire with the sheeted compound inserted to form a circumferential layer or as a reinforcing face between and interconnecting adjacent radial cords.

In addition, the complete radial ply tire may be made from the materials of this invention and when so made it may be fabricated by the more economical methods which are presently limited to bias ply tires. In the first instance, the radially reinforced face of such tires may be made up as a ply of the materials of this invention having the reinforcing glass fibers oriented transveresly to the tread or perpendicularly to the bead. Superimposed bias plies may then be formed, as previously described, from alternating plies of the sheeted material in which the orientation of the reinforcing glass fibers of each ply forms an angle with the orientation of the reinforcing glass fibers of adjacent plies. A circumferential reinforcing belt or layer can then be formed as a strip of the material of this invention with the glass fibers oriented parallel to the length of the tread. The tread may comprise a form of the compounded material in which the fibers are randomly oriented for multi-directional strength with increased tread wear and heat dissipation.

Molding material embodying the features of this invention can be used efficiently to fabricate radial tires by techniques conventional to bias tires wherein the carcass is expanded upon the forming drum, rather than statically molded, as in the case of present radial tire manufacture. This is made possible by the fact that the avoidance of continual reinforcements reduces the degree of precision with which the reinforcements must be positioned and maintained. For example, in systems heretofore employed, the expansion of a tire carcass containing continuous radial fiber reinforcement can substantially displace adjacent reinforcements thereby to yield large gaps therebetween or it can thrust the reinforcement fibers to either surface of the carcass. In addition, expansion operates to change the width of the carcass without a corresponding change in the dimension of the fiber reinforcement. As a result, the reinforcement is placed under extreme stress and is displaced towards the interior surface of the tire. Upon relaxation of the expansion, the stress is removed and the reinforcement fibers are relaxed to diminish their reinforcing effect. On the other hand, the sheeted materials, produced in accordance with the practice of this invention, are not affected by such distortions or expansions since the individual glass fibers are not fixed. Instead they are uniformly dispersed and are able to move in concert with the elastomer to yield neither unreinforced areas nor stressed and relaxed reinforcements. At the same time, the riding properties are improved without detracting from the desirable properties inherent in a radial tire. This results from the use of discontinuous but radially oriented glass fiber reinforcement. In a conventional radial tire, the radial reinforcement provides the general structural properties of an arch in that pressure applied to the zenith of the arch is transmitted through the laterals and resisted by the immobile foundation provided by the bead and wheel rim, with slight lateral deflection. In essence, the continuous radial reinforcement operates longitudinally to transmit compressive and tensile forces equally in a push-pull effect, while the ideal radial reinforcement should withstand high longitudinal tensions thereby yielding carcass strengths and an acceptable cushioning distortion without transmitting longitudinal compressive strengths since the latter produces a hard ride. Accordingly, the radial reinforcement functions as a flexible linked chain of high tensile strength but with a lower transmission of compressive forces. The use of oriented discontinuous fibers, in accordance with the practice of this invention, achieves, to a substantial degree, this effect in that it provides high tensile strength while avoiding the stiffness of a continuous more rigid radial reinforcement.

As previously described, the glass fiber-elastomeric compositions of this invention may be employed as a limited but beneficial phase of other elastomeric structures, such as rubber drive belts. For example, conventional belt making techniques which involve laying up and laminating plural layers of construction materials, e.g. fabric facings, rubber cushioning plies, etc., and then cutting and sciving the plural layer cylinder into drive belts, may be simply modified by introducing a ply of the glass fiber elastomer of this invention in the zone which lies in the plane of the pitch or tension line of the ultimate belt. Similarly, optimally designed belt structures may be devised by this technique or modifications thereof. For example, a belt can be formed with a ply of the described molding compound positioned at the pitch line and with the fibers in the ply oriented in a longitudinal direction or parallel to the direction of normal tension, thereby to enhance tensile strength, general stability and resistance to elongation. Alternatively, or in combination therewith, other plies containing the glass fibers oriented across the width of the belt can be positioned in other sections of the belt, such as the apex of the V, to provide stability, resistance to lateral distortion and wear and improved heat dissipation, without appreciably impairing the suppleness of the structure.

The glass fiber-elastomeric compositions of this invention can be utilized as an auxiliary reinforcement in elastomeric structures employing continuous fibrous glass as a primary reinforcement or continuous reinforcements other than glass such as cotton, polyamide resin, polyester cords, fabrics and the like. In such applications, a secondary phase made up of the materials of this invention operate to augment the properties of the primary reinforcement by paralleling the latter and by supplying improved stability, tensile strength and resistance to elongation.

In the systems which make use of both glass and nonglass continuous primary reinforcements, the glass fiberelastomeric systems embodying the features of this invention will operate to improve the interaction of the continuous reinforcements through orientation with short glass fibers which will extend perpendicular to the continuous reinforcement and function as a spanning or linking agent therebetween. In the system which makes use of parallel continuous cords as tension members in drive belts, the longitudinal splitting or cracking of the belt is independent of its tensile strength. Improved transverse strengths can be achieved by use of compositions of this invention with the fibers oriented across the width of the belt, either in the immediate plane of the continuous reinforcement or in adjacent planes which parallel the continuous reinforcements.

In radial tires, the tire side wall can split between adjacent radial cords. This unreinforced zone can be greatly improved by use of compositions embodying the features of this invention to provide glass fibers oriented in a direction perpendicular to the continuous radial reinforcement. This technique operates to reduce cracking of the side wall while improving the tensile strength of the tire both in the major peripheral direction and in the cross-sectional circumferences of the tire since the former is directly reinforced by the fibers introduced through materials of this invention while the latter is implemented by virtue of the fact that the radial continuous tension elements are linked for interaction through the perpendicular short fibers. At the same time, the inherent flexibility and cushioning of the tire is preserved since only adjacent radial reinforcements are interconnected as distinguished from a continuous reinforcement perpendicular to the radial reinforcement.

In addition to employing the glass-elastomeric materials of this invention as a means for imparting designed property improvements to existing elastomeric structures, conventional fabricating and processing techniques can be used directly, or with slight modification, to achieve or to optimize the properties inherent in the materials of this invention. For example, the extrusion of the described compositions may reduce the unidirectional orientation of the fibers. Such random orientation, and consequent multi-directional reinforcement, can be used to advantage, as in the fabrication of a drive belt with longitudinal tensile strength, stability and resistance to elongation provided by reinforcements oriented longitudinally and combined with transverse resistance to splitting and deformation by reason of fibers which are oriented in the transverse dimension of the belt. While the multi-directional orientation of the reinforcement will diminish the essential longitudinal tensile strength of the belt to some degree, additional desirable properties can be realized while the total glass fiber content can be increased statistically to compensate for any reduction of tensile strength in any direction.

It will be apparent that the stability attributed to the materials produced in accordance with the practice of this invention is a multi-faceted improvement. First, it includes the prevention of elongation under stress and the prevention of permanent distortion. The former property is particularly significant in drive belts in which elongation reduces efficiency and necessitates frequent readjustments. Permanent distortion, resulting from inadequate stability, is significant also in respect to tires, belts and reinforced elastomeric structures. A drive belt which distorts can change the contact conditions with the pulley, overlap the pulley flanges, shift the reinforcements from the pitch or tension line and cause delamination, excessive wear, reduced efficiency, belt breakage, and the like. While permanent distortion of a tire is normally referred to as side wall bulge, it also exists in changes in tread width which yield suspension and noise problems.

It will be apparent from the foregoing that I have provided a new and improved composition which can be used in the fabrication of elastomeric products in which the reinforcement with glass fibers is such as to enable high strength and wearability characteristics to be achieved without the need for making use of separate fibers, fabrics, cords, or yarns of fibrous materials for combination with the elastomeric materials in the formation of the molded elastomer products.

It will be understood that changes may be made in the details of construction, formulation and fabrication without departing from the spirit of the invention, especially as defined in the following claims.

I claim:
1. In the method of producing a molding compound of elastomeric material reinforced with glass fibers, the steps consisting of providing separate bundles of glass fibers in which each bundle is formed of a multiplicity of glass fibers, working the elastomeric material by passage between working rolls for a plurality of working passes, adding a minor proportion of the full increment of glass fiber bundles to the elastomeric material before the final passes of the elastomeric material between the working rolls whereby exposure of the bundles of glass fibers to working with elastomeric material operates to separate the glass fiber bundles into separated glass fibers and separated bundles of glass fibers having lesser concentration of glass fibers than the original bundle, adding the remainder of the glass fiber bundles to the thusly worked glass fiber-elastomeric material before the final passes of the elastomeric material between the working rolls whereby a molding compound is produced in which the amount of separation of the glass fiber bundles added during the final stages of working is less than the amount of separation of the minor proportion of glass fiber bundles subjected to the greater amount of working whereby a molding compound is produced in which the major proportion of the glass fibers are distributed throughout the elastomeric material as glass fiber bundles formed of a multiplicity of glass fibers while a minor proportion of the glass fibers are distributed throughout the elastomeric material as separated bundles having a lesser concentration of glass fibers and individual glass fibers.

2. The method of producing a molding compound as claimed in claim 1 in which at least 70 percent by weight of the glass fiber component is added during the final passes.

3. The method of producing a molding compound as claimed in claim 1 in which three to five passes between the work rolls are taken with the initial minor proportion of glass fibers and a total of seven to nine passes are taken with the total increment of glass fibers.

4. The method as claimed in claim 1 in which the glass fiber bundles introduced into the elastomeric material are impregnated with a composition containing an elastomeric material that is compatible with the elastomeric material forming the continuous phase of the molding compound.

5. The method as claimed in claim 1 in which the fibers added to the elastomeric material in the formation of the molding compound have a coating on the surfaces thereof containing an anchoring agent which enhances the bonding relationship between the glass fiber surfaces and the elastomeric material.

References Cited
UNITED STATES PATENTS 1,671,914   5/1928   Wescott _____ 264—174

ROBERT F. WHITE, *Primary Examiner.*

R. B. MOFFITT, *Assistant Examiner.*